United States Patent Office 3,314,904
Patented Apr. 18, 1967

3,314,904
GUM PLASTIC COMPOSITIONS CONTAINING A RESINOUS GRAFT COPOLYMER AND A COMPATIBLE RUBBER
John Burkus, Woodbridge, Conn., assignor to United States Rubber Company, New York, N.Y., a corporation of New Jersey
No Drawing. Filed Dec. 27, 1962, Ser. No. 247,547
11 Claims. (Cl. 260—4)

This invention is a new composition of matter which comprises a blend of a resin component with a compatible rubbery component to produce a "gum plastic." The resin component is a graft polymer of styrene, or styrene and acrylonitrile, on polyethylene or polypropylene, and the compatible rubber is selected from certain non-polar rubbers when the said graft copolymer is based on styrene, and from certain polar rubbers when the said graft copolymer is based on styrene and acrylonitrile.

The invention also relates to a graft copolymer of styrene and acrylonitrile on polypropylene as a new composition of matter characterized by a surprising and unexpected ability to yield extrudable compositions which can be extruded with unusual rapidity, to produce remarkably smooth and glossy extruded objects.

In more detail the invention embraces a composition comprising an intimate mixture of
(A) a resinous graft copolymer selected from the group consisting of
   (a) resinous graft copolymer of styrene on a poly-1-olefin selected from the group consisting of polyethylene and polypropylene, and
   (b) resinous graft copolymer of a mixture of styrene and acrylonitrile on a poly-1-olefin selected from the group consisting of polyethylene and polypropylene, and
(B) a rubber, compatible with said graft copolymer, selected from the group consisting of
   (c) rubbery copolymers of butadiene and styrene,
   (d) rubbery copolymers of ethylene and propylene,
   (e) Hevea rubber
   (f) cis-polybutadiene
   (g) polychloroprene
   (h) rubbery graft copolymers of styrene on polybutadiene
   (i) rubbery copolymers of butadiene and acrylonitrile, and
   (j) rubbery graft copolymers of styrene and acrylonitrile on polybutadiene,
the said rubber being selected from the group consisting of non-polar rubbers (c), (d), (e), (f), (g) and (h) when the said resinous graft copolymer is (a), and the said rubber being selected from the group consisting of polar rubbers (i) and (j) when the said resinous graft copolymer is (b), the proportions of said graft copolymer (A) and said rubber (B) being from 60 to 95% by weight of (A) and correspondingly from 40 to 5% by weight of (B), based on the total weight of (A) plus (B).

There is a voluminous literature concerning mixtures of rubbery polymers with hard resins to give "gum plastics," i.e., high-impact thermoplastic compositions. Many varieties of graft copolymers are known.

Harrison et al., U.S. Patent 2,614,089, October 14, 1952 to Goodrich, copolymerizes butadiene and a copolymerizable monomer, which may be styrene, in the presence of a polymeric hard resin, e.g., poly(vinyl chloride), to get a vulcanizable rubber.

Childers and Fisk, U.S. Patent 2,820,773 grafts styrene, or acrylonitrile, or both, onto rubbery polybutadiene and mixes the graft copolymer with styrene-acrylonitrile resin to get gum plastics.

Dobo, Magyar Kem. Lapja, 13, 76–9 (1958); C.A. 52, 17790 (1958), shows grafting of styrene onto polyethylene sheet irradiated by 220 kv., 15-ma. radiation.

Bartlett et al., British Patent 783,790 grafts styrene onto polyethylene by means of benzoyl peroxide.

Ballantine et al., J. Polymer Sci., 19, 219 (1956) irradiates polyethylene in styrene monomer to get 10.2 weight percent of styrene grafted onto the polyethylene.

Williams et al., British Patent 514,687, application date, May 3, 1938, shows incorporation of certain rubber-like materials—namely, linear substantially saturated hydrocarbon polymers, such as normally solid, high molecular weight isoolefin polymers, especially polyisobutylenes, and hydrogenated natural rubber—in polyethene to give products which are apparently substantially homogeneous and which are more flexible, of higher melting point and of increased notch bend resistance compared with initial polyethylene.

West, U.S. Patent 2,556,158, patented June 12, 1951, polymerizes ethylene in the presence of rubber to get condensation products of ethylene and rubber which are wax-like; the waxes are harder and have a higher melting point than the grease-like polymers produced in the absence of rubber.

British Patent 801,479, patented September 17, 1958 (application made in the United States June 5, 1956), shows grafting of an organic polymer, e.g., polyethylene, with a dissimilar organic material; e.g., vinyl chloride, by means of ionizing charged particle radiation.

The present gum plastics represent a novel material having many interesting properties, made by mixing either the non-polar resinous graft of styrene on a poly-1-olefin with a compatible non-polar rubber, or the polar graft copolymer of styrene and acrylonitrile on a compatible polar rubber. The mixture of the invention may be made by blending the resin and rubber together in accordance with any suitable conventional mixing method, to make a uniform mixture.

In another aspect, as indicated previously, the invention provides a resinous graft copolymer which is in itself new, namely, a graft copolymer of styrene and acrylonitrile on polypropylene. The unusual characteristics of this new graft copolymer will be made manifest hereinbelow.

The resinous graft copolymer (A) of styrene or styrene and acrylonitrile on polyethylene or polypropylene is made by first "activating" the polyethylene or polyproplylene by subjecting it to high-energy ionizing radiation, and then contacting the irradiated poly-l-olefin with styrene, or styrene and acrylonitrile, and subjecting the mixture to polymerizing conditions to produce the graft copolymer. For optimum results the amount of grafted monomeric material (styrene or styrene-acrylonitrile) in the graft copolymer should be high, that is, at least 75% of the graft copolymer composition should be bound styrene or styrene-acrylonitrile, preferably 85 to 95%, and more preferably 90 to 95%, based on the weight of the graft copolymer preparation. In the case of grafts based on styrene and acrylonitrile, the proportions of styrene and acrylonitrile relative to each other are not critical, and may vary as desired (preferably 60–95 parts of styrene to correspondingly 40–5 parts acrylonitrile, more preferably 70–85 styrene, 30–15 acrylonitrile, per 100 parts of styrene and acrylonitrile). Typically, linear polyethylene or polypropylene of low bulk density and large surface area per unit weight is preferably used as the substrate for the resinous graft copolymer. The use of such a substrate favors the desired high content of grafted monomers, that is, the physical character of the substrate onto which the monomers are grafted is a determining factor for the amount of monomers that can be grafted thereon. Thus, a particularly suitable substrate is polyethylene in an expanded "crumb"

form which is obtained from commercial manufacture of linear polyethylene, prior to the final finishing operations. Commercially available, and preferred, examples of suitable polyethylenes are those known as the "Grex Crumbs" (trademark of W. R. Grace Chemical Co.). The "Grex Crumb" polymers are coarse, fibrous polyethylenes. Some data on commercial examples follw:

| W. R. Grace Code | Density (g./cc.) | Melt Index | Composition |
| --- | --- | --- | --- |
| 60-050E | 0.960 | 5.0 | Ethylene. |
| 50-050C | 0.950 | 5.0 | Ethylene-Butylene. |
| 60-007E | 0.960 | 0.7 | Ethylene. |
| 60-002E | 0.960 | 0.2 | Do. |

Similarly, the graft copolymer substrate, may be high molecular weight polypropylene, described for example by Kresser, "Polypropylene," Reinhold, New York, 1960, as exemplified by the highly crystalline, small particle size commercially available material known as "Profax 6501" (trademark Hercules Powler Company).

As for the rubbers that are mixed with the resinous graft copolymer to form the gum plastic of the invention, selected from polar rubbers or non-polar rubbers depending on whether or not the graft copolymer contains acrylonitrile, such rubbers are well known materials that require no detailed description here. Thus, the rubbery copolymer of butadiene and styrene, known as SBR, frequently contains up to 45–50% styrene, usually about 20–35%. Ethylene-propylene rubbers (EPR) frequently contain 26–70% propylene, with or without a non-conjugated diolefin. Cis-polybutadiene frequently has a cis-content of 40–98% or more. Rubbery graft copolymers of styrene or polybutadiene conventionally contain 5–50% styrene. Rubbery copolymers of butadiene and acrylonitrile usually have 10–40%, preferably 25–35%, of acrylonitrile; the butadiene-acrylonitrile rubber is most suitably of the high gel type (75–90% or more gel). The rubbery graft copolymer of styrene and acrylonitrile on polybutadiene conventionally contains 5–50% of styrene and acrylonitrile (in any desired ratios, e.g. 5:95 to 95:5) on polybutadiene; again, the polybutadiene is most suitably of the high gel type (75–90% or more gel).

It is desired to emphasize that although graft copolymer resins other than the graft copolymer of styrene and acrylonitrile on polypropylene may be used to make novel gum plastics of the invention, nevertheless the said graft copolymer of styrene and acrylonitrile on polypropylene is not merely a full equivalent of such other graft copolymer resins. In particular the graft of styrene and acrylonitrile on polypropylene is characterized by remarkably improved ability to yield compositions which are rapidly extrudable to produce smooth, shiny objects.

Examples I, II and III illustrate a method for preparing the grafts based on polyethylene.

EXAMPLE I

Into a 10-gal. reactor is charged 16 liters of inhibitor-free, dry styrene monomer and 16 liters of methanol. The solution is flushed with nitrogen for one-half hour. The reactor is then charged with 1200 gms. of irradiated polyethylene. [The polyethylene ("Grex Crumb" of large surface area per unit weight) was irradiated in air while on Dry Ice with 2-megavolt electrons, to a dosage of 8 watt-hours per pound. The irradiated polyethylene was kept cold with Dry Ice until charged into the reactor.] Stirring is started and the reaction temperature is maintained at 73° F. After a 24-hour reaction period the reactor is drained, the graft is soaked in 2-butanone for two hours, the 2-butanone is drained off, and the graft polymer dried in an air oven at 70° C. A yield of 9 kilograms of product, consisting of 86.6% by weight of polystyrene grafted onto polyethylene, was obtained after a 24-hour reaction period.

EXAMPLE II

Using the procedure described in Example I, 8 liters of styrene monomer and 8 liters of methanol and 800 gms. of irradiated linear polyethylene in a 5-gal. reactor gave 6400 gms. of graft copolymer (87.5% styrene) after a 12-hour reaction period.

EXAMPLE III

Using the procedure described in Example I, in a 5-gal. reactor, 8 liters of styrene monomer, 8 liters of methanol, and 1000 gms. of linear polyethylene gave 4600 gms. of product after an 8-hour reaction period.

Graft copolymers were prepared as in Example I, II and III, to contain from 75% to 95% of styrene, by suitably controlling the time, temperature and irradiation dosage. A graft copolymer so prepared is banded on a rubber mill at 315–330° F. for five (5) minutes. The selected elastomer is added and blended thoroughly. The blend is removed from the mill and a plaque is prepared for physical testing. The data presented in the tables below are intended to illustrate the invention but not to limit the scope thereof. Tests are made according to standard ASTM methods.

TABLE I

This table compares the physical properties of gum plastic controls prepared by using SBR–1500 as the rubbery component and Styron 475 as the resin component, with a gum plastic made according to the invention (JB–V–28 plus SBR–1500).

| Stock | B | G |
| --- | --- | --- |
| Styron 475 [1] | 100 | |
| JB-V-28 [2] | | 100 |
| SBR-1500 [3] | 20 | 20 |
| Properties: | | |
| Izod notched impact (ft.-lb./inch of notch, room temp.) | 3.62 | 7.03 |
| Torsional modulus×10⁻³ (p.s.i., 25° C.) | 247 | 242 |
| Tensile, p.s.i. | 2,780 | 3,740 |
| Flexural strength, p.s.i. | 3,640 | 6,400 |
| Heat distortion temp., ° C | 80.5 | 88.0 |
| Rockwell R hardness | 71 | 91 |

[1] High impact polystyrene—product of Dow Chemical, contains about 5% of a rubbery SBR elastomer.
[2] A graft of styrene on Grex 60-002 polyethylene, containing 85% by weight of styrene and prepared according to Example I.
[3] A commercially available styrene/butadiene elastomer, containing about 20–23% bound styrene.

It will be noted that Stock G, a composition of the instant invention is unexpectedly remarkably superior to Stock B with respect to notched impact, tensile, flexural strength, heat distortion temperature and Rockwell R hardness.

TABLE II

This table compares a mixture of styrene homopolymer and linear polyethylene with a graft of polystyrene on polyethylene, as resin components in blends with cis-polybutadiene rubber.

| Stock | H | I |
| --- | --- | --- |
| Grex 60-050E [1] | 15 | |
| Styron 475 [2] | 85 | |
| JB-IV-298 [3] | | 100 |
| Cis-polybutadiene [4] | 10 | 20 |
| Properties: | | |
| Izod notched impact (ft. lb./inch of notch, at R.T.) | 0.928 | 1.61 |
| Torsional modulus×10⁻³ (p.s.i. 25° C.) | 226 | 214 |
| Tensile, p.s.i. | 2,030 | 2,413 |
| Flexural strength, p.s.i. | 2,705 | 3,465 |
| Heat distortion temp., ° C | 82.5 | 86.5 |
| Rockwell R hardness | 62 | 65 |
| Elongation, percent | 4.9 | 6.6 |

[1] Linear polyethylene, of density 0.960, melt index 5.0.
[2] High impact polystyrene—sold by Dow Chemical Company containing about 5% SBR rubber elastomers.
[3] Styrene graft (85% by weight) on Grex 60-050C.
[4] Rubbery cis-polybutadiene, from Phillips Petroleum Co.

These data show that, of two compositions of similar torsional modulus, a styrene/polyethylene graft copolymer mixed with cis-polybutadiene—a composition of the instant invention—is remarkably superior to a mixture of linear polyethylene, linear polystyrene and cis-polybutadiene, in impact strength, tensile, flexural strength and heat distortion temperature. Most surprisingly and unexpectedly, this enhancement of properties is attained without sacrificing hardness.

TABLE III

This table shows the superiority of a graft copolymer of styrene on polyethylene (Stock G) over a mechanical mixture of polyethylene and polystyrene (Stock A), as a resin for mixing with SBR–1500 rubber to produce gum plastics. Similar comparisons are made by Stocks C and H.

| Stock | A | C | G | H |
|---|---|---|---|---|
| Grex 60–050E | 15 | 15 | | |
| Styron 475 | 85 | 85 | | |
| JB–IV–226 [1] | | | 100 | 100 |
| SBR–1500 [2] | 5 | 20 | 20 | 30 |
| Properties: | | | | |
| Izod notched impact, R.T., ft.-lb./inch, notch | .0442 | 1.05 | 3.60 | 8.16 |
| Torsional modulus×10⁻³, p.s.i., 25° C. | 252 | 183 | 244 | 182.5 |
| Tensile, p.s.i. | 2,533 | 2,287 | 4,350 | 3,490 |
| Flexural strength, p.s.i. | 3,430 | 2,880 | 6,460 | 4,450 |
| Heat distortion temp., ° C. | 84.0 | 82.0 | 93.5 | 87.0 |
| Rockwell R hardness | 79 | 48 | 86 | 66 |

[1] A graft of polystyrene on Grex 60–050C polyethylene, 87.5% polystyrene by weight.
[2] Styrene-butadiene rubbery copolymer. ("Cold rubber," 22% styrene.)

Comparison of Stocks A and G which have similar torsional modulus show that Stock G, which contains graft copolymer of styrene on polyethylene, is superior to Stock A which consists of a mixture of polyethylene and polystyrene with SBR–1500, with respect to tensile, flexural modulus, heat distortion temperature and hardness. A similar comparison of Stocks C and H shows that H, a composition of the instant invention, has properties superior to those of C, the latter being made from a mixture of polyethylene and polystyrene in SBR–1500 rubber.

TABLE IV

This table shows that the styrene/polyethylene graft copolymer can be blended with rubbery polyethylene-propylene polymers to give useful gum plastics, and that these gum plastics possess better physical properties than do the products wherein the graft copolymer is replaced by a mechanical mixture of polyethylene and polystyrene.

| Stock | A | B |
|---|---|---|
| Grex 60–050E | 15 | |
| Styron 475 | 85 | |
| JB–IV–298 | | 100 |
| EPR [1] | 20 | 20 |
| Properties: | | |
| Izod notched impact, ft.-lb./inch notch, R.T. | 0.557 | 2.05 |
| Torsional modulus×10⁻³, p.s.i., 25° C. | 166.5 | 161.5 |
| Tensile, p.s.i. | 1,573 | 2,367 |
| Flexural strength, p.s.i. | 2,355 | 3,070 |
| Heat distortion, ° C. | 82.0 | 90 |
| Rockwell R hardness | 51.0 | 49 |

[1] Ethylene-propylene copolymer (60% propylene); intrinsic viscosity (in cyclohexane at 30° C.) 2.2.

TABLE V

This table shows that blends of irradiated Grex 60–050E with SBR–1500 do not possess the superior properties exhibited by blends of SBR–1500 with graft copolymers of styrene and linear polyethylene. The poor qualities of the former blends are shown in this table.

| Stock | | | | | |
|---|---|---|---|---|---|
| Grex 60–050E [1] | 100 | 100 | 100 | 100 | 100 |
| SBR–1500 [2] | 0 | 5 | 10 | 20 | 40 |
| Izod notched impact, ft.-lb./in. notch, R.T. | 0.655 | 0.685 | 0.857 | 1.25 | 4.24 |
| Torsional modulus×10⁻³, p.s.i., 25° C. | 200 | 184 | 174 | 126 | 95.6 |
| Tensile, p.s.i. | 3,865 | 2,870 | 3,503 | 2,973 | 2,093 |
| Flexural strength, p.s.i. | 3,900 | 3,250 | 3,220 | 2,595 | 2,105 |
| Heat distortion, ° C. | 62.0 | 63.0 | 63.0 | 55.0 | 69.0 |
| Rockwell R hardness | 68 | 63 | 52 | 40 | ([3]) |
| Elongation, percent | 13.2 | 19.8 | 23.1 | 28.1 | 19.9 |

[1] Linear polyethylene, density 0.960, melt index 5.0, irradiated to 8 watt hours per pound.
[2] Styrene-butadiene copolymer (22% styrene), cold polymerization technique.
[3] Too soft.

TABLE VI

The data in this table show that general purpose polystyrene, designated Styron K–27 is inferior to the graft copolymer of styrene on polyethylene, designated JB–V–28 as a resin for blending with SBR–1500 rubber.

| Stock | A | B |
|---|---|---|
| JB–V–28 | 100 | |
| Styron K–27 | | 100 |
| SBR–1500 | 30 | 50 |
| Properties: | | |
| Torsional modulus×10⁻³, p.s.i., 25° C. | 180 | 187 |
| Notched impact, ft.-lb./in. notch R.T. | 8.4 | 5.5 |
| Tensile, p.s.i. | 2,995 | 2,320 |
| Elongation, percent | 11.6 | 0.24 |

The extremely low elongation of Stock B is indicative of its crumbly character.

TABLE VII

The data in this table show that a rubbery copolymer made by grafting styrene onto polybutadiene is useful as the rubbery component for blending with a graft copolymer of styrene on polyethylene.

Stock J

JB–V–268 [1] _____ 70
Rubber K [2] _____ 30
Properties:
  Izod notched impact, ft.-lb./inch of notch, R.T. _____ 1.20
  Izod notched impact, ft.-lb./inch of notch, −20° F. __ 1.16
  Torsional modulus×10⁻³ (p.s.i., 25° C.) __ 320
  Flexural strength, p.s.i. _____ 6,560
  Elongation _____ 13.2
  Heat distortion temp., ° C. _____ 82.5
  Rockwell H hardness _____ 94

[1] A copolymer composed of 83% by weight of styrene grafted onto polyethylene.
[2] A rubbery high polymer obtained by grafting 50 parts by weight of styrene on rubbery polybutadiene. Such products are described by Hays, U.S. Patent 2,755,270.

These data show the product to be a relatively tough, hard material suitable for structural purposes.

The high styrene graft copolymers on polyethylene of this invention used either alone, or as mixtures with a compatible rubber, are superior to polystyrene, to polystyrene-polyethylene mixtures, and to polystyrene-polyethylene-rubber mixtures, with respect to resistance to the solvent action of fluorocarbon solvents.

Plaques of the following were prepared:

(a) Styron 475.
(b) A graft of 83 parts of styrene onto 17 parts of polyethylene.

(c) mixture of 83 parts of Styron 475 and 17 parts of polyethylene Grex 60–050E.
(d) A mixture of 70 parts of A and 30 parts of rubber K.
(e) A mixture of 70 parts of B and 30 parts of rubber K.
(f) A mixture of 70 parts of C and 30 parts of rubber K.

All parts are by weight. All mixtures were prepared on a two-roll mill and molded in a conventional manner. Each plaque was immersed in liquid chlorofluoromethane for 15 minutes at room temperature, then removed and dried for 30 minutes in air at 60° C. Plaques B and E were dimensionally stable under these conditions, there being only a slight roughening and pitting of the surfaces. Plaques A, C, D, on the other hand, were badly blown and all dimensions had increased very considerably.

An example of the preparation of a graft interpolymer of a mixture of styrene and acrylonitrile onto polypropylene follows.

EXAMPLE IV

Five hundred eighty grams of polypropylene ("Profax 6501") is irradiated, on Dry Ice and in a carbon dioxide atmosphere, with 2-megavolt electrons, to a dosage of 16 watt hours per pound. The irradiated product rapidly loses its ability to be grafted onto by monomers if it is exposed to air. Therefore, it is kept cold and in an inert atmosphere, such as in $CO_2$, until it is charged into the reactor for subsequent grafting.

Into a 10-gallon stainless steel reactor are charged 12.36 liters of styrene, 3.47 liters of acrylonitrile and 16.0 liters of methanol. The air is displaced by nitrogen, then the 580 grams of irradiated polypropylene is added and the apparatus is again flushed with nitrogen. The reaction mixture is heated at 158° F., with stirring for 12 hours. The product is then isolated in the same way as the graft interpolymer of acrylonitrile, styrene and polyethylene below described. There is obtained 5730 grams of the graft interpolymer of styrene, acrylonitrile and polypropylene as a white solid crumb, resembling the starting polypropylene in appearance and having an ML–4 of 65 at 350° F. It is labelled B–2. Analysis shows the product to be 90 percent by weight grafted styrene plus grafted acrylonitrile, the weight ratio of styrene to acrylonitrile in the graft being 79.4:20.6.

An example of a graft of a mixture of styrene and acrylonitrile onto polyethylene follows.

EXAMPLE V

Six hundred grams of "Grex Crumb 50–050C" polyethylene is irradiated in air, while Dry Ice, with 2-megavolt electrons, to a dosage of 8 watt-hours per pound.

Into a 10-gallon reactor are charged 12.36 liters of pure styrene monomer, 3.47 liters of acrylonitrile and 16 liters of methanol. After displacing air by nitrogen the 600 grams of irradiated polyethylene is added. The mixture is again flushed with nitrogen, then heated at 86° F., with stirring, for 24 hours. The reactor is now drained, the product soaked in 2-butanone for 2 hours, drained and the graft interpolymer dried for 12 hours at 158° F. There is obtained 4356 grams of graft interpolymer as a white crumb resembling the starting polyethylene. It has a Mooney viscosity, ML–4, of 63 at 350° F. and contains 17.2 percent acrylonitrile and 69.1 percent styrene by weight. It is labelled B–1.

EXAMPLE VI

The above grafts of Examples IV and V (separately) are blended on a 2-roll mill at 340° F. for 5 minutes with a rubbery interpolymer of acrylonitrile and 1,3-butadiene or with a rubbery graft of a mixture of styrene and acrylonitrile onto rubbery polybutadiene.

The blends are shaped in a press at 320° F. The press is cooled and the shaped pieces are removed and the physical properties thereof are measured in a conventional manner. Typical data are recorded in the table which follows.

TABLE VIII

| Stock Code | Parts by weight | | | |
|---|---|---|---|---|
| | A | B | C | D |
| Materials: | | | | |
| B–1 | 100 | 80 | 80 | |
| B–2 | | | | 70 |
| Rubber A [1] | 30 | | | |
| Rubber B [2] | | 20 | | |
| Rubber C [3] | | | 20 | 30 |
| Properties: | | | | |
| ML–4 at 350° F | 88 | 70 | 70 | 74 |
| Notched impact, ft.-lbs./in. notch R.T. | 3.06 | 3.51 | 6.74 | 6.68 |
| Notched impact, ft.-lbs./in. notch, −20° F. | 0.78 | 0.47 | 0.42 | 1.93 |
| Torsional modulus×$10^{-3}$, p.s.i., 25° C. | 330 | 252 | 255 | 329 |
| Flexural Strength, p.s.i., 25° C. | 9,660 | 8,180 | 7,655 | 7,985 |
| Tensile, p.s.i., 25° C. | 4,750 | 5,030 | 5,080 | 5,807 |
| Percent Elongation | 9.9 | 11.6 | 28.1 | 12.0 |
| Hardness, Rockwell, R | 107 | 99 | 96 | 102 |

[1] Rubber A is a two component material. One component (75 percent by weight of the total) is a rubbery graft of a mixture of styrene and acrylonitrile onto a highly gelled polybutadiene having the composition of about 22.5 percent sytrene, 10.5 percent acrylonitrile and 67 percent polybutadiene. The other component (25 percent by weight of the total) is a high molecular weight copolymer which is about 68 percent styrene and 32 percent acrylonitrile. This rubber is made according to Childers et al., U.S. Patent 2,820,773, January 21, 1958 assigned to U.S. Rubber, column 4, lines 36–55.
[2] Rubber B is a highly gelled interpolymer of a major amount of butadiene and acrylonitrile and a minor amount of divinyl benzene. The weight ratio of butadiene to acrylonitrile is about 65:35. This rubber and a method of making it are described by Romeyn et al., U.S. Patent 2,597,951, May 27, 1952, assigned to U.S. Rubber Company, column 4, lines 15–47.
[3] Rubber C is a highly gelled (about 77 percent) rubbery terpolymer made from a monomer mixture consisting initially of 65 parts (by weight) butadiene, 35 parts acrylonitrile and 1.5 parts of divinyl benzene and containing these monomers substantially in this ratio.

The gum plastics described in the above table are seen to possess the desirable properties of being hard and tough at the same time. In addition, particularly those based on polypropylene are found to be extrudable to give products having a very smooth and very glossy surface. Further, the compositions based on polypropylene can be extruded at a faster rate than commercially available gum plastics, such as those of Childers, above cited.

The preferred ratios, by weight, of resin to rubber in the gum plastic are from about 70/30 to 95/5. For this purpose Rubber A of Table VIII is considered to be 50 percent rubber and 50 percent resin. Rubber B and Rubber C are considered to be 100 percent rubber.

Having thus described my invention, what I claim and desire to protect by Letters Patent is:

1. A composition comprising an intimate uniform mixture made by blending together
   (A) a resinous graft copolymer selected from the group consisting of
      (a) resinous graft copolymer of from 75 to 95% by weight of bound styrene on correspondingly from 25 to 5% by weight of a linear poly-1-olefin selected from the group consisting of polyethylene and polypropylene, and
      (b) resinous graft copolymer of from 75 to 95% by weight of bound styrene and acrylonitrile on correspondingly from 25 to 5% by weight of a linear poly-1-olefin selected from the group consisting of polyethylene and polypropylene, and
   (B) a rubber, compatible with said graft copolymer, selected from the group consisting of
      (c) rubbery copolymers of butadiene and styrene,
      (d) rubbery copolymers of ethylene and propylene,
      (e) Hevea rubber
      (f) cis-polybutadiene
      (g) polychloroprene
      (h) rubbery graft copolymers of styrene on polybutadiene (i) rubbery copolymers of butadiene and acrylonitrile, and
(j) rubbery graft copolymers of styrene and acrylonitrile on polybutadiene, the said rubber being selected from the group consisting of non-polar rubbers (c), (d), (e), (f), (g) and (h) when the said resinous graft copolymer is (a), and the said rubber being selected from the group consisting of polar rubbers (i) and (j) when the said resinous graft copolymer is (b), the proportions of said graft copolymer (A) and said rubber (B) being from 60 to 95% by weight of (A) and correspondingly from 40 to 5% by weight of (B), based on the total weight of (A) plus (B).

2. A composition as in claim 1, in which the said graft copolymer resin (A) is a graft copolymer on polyethylene.

3. A composition as in claim 1, in which the said graft copolymer resin (A) is a graft copolymer on polypropylene.

4. A composition as in claim 1, in which the said graft copolymer is the said resinous graft (a) and the said rubber is the said butadiene-styrene copolymer (c).

5. A composition as in claim 1, in which the said graft copolymer is the said resinous graft (a) and the said rubber is the said ethylene-pyropylene copolymer (d).

6. A composition as in claim 1, in which the said graft copolymer is the said resinous graft (a) and the said rubber is the said Hevea rubber (e).

7. A composition as in claim 1, in which the said graft copolymer is the said resinous graft (a) and the said rubber is the said cis-polybutadiene (f).

8. A composition as in claim 1, in which the said graft copolymer is the said resinous graft (a) and the said rubber is the said polychloroprene (g).

9. A composition as in claim 1, in which the said graft copolymer is the said resinous graft (a) and the said rubber is the said rubbery graft copolymer of styrene on polybutadiene (h).

10. A composition as in claim 1, in which the said graft copolymer is the said resinous graft (b) and the said rubber is the said butadiene-acrylonitrile rubber (i).

11. A composition as in claim 1, in which the said graft copolymer is the said resinous graft (b) and the said rubber is the said rubbery graft copolymer of styrene and acrylonitrile on polybutadiene (j).

References Cited by the Examiner
UNITED STATES PATENTS

| | | | |
|---|---|---|---|
| 2,282,002 | 5/1942 | Scott et al. | 260—4 |
| 2,987,501 | 6/1961 | Rieke et al. | 260—878 |
| 3,162,696 | 12/1964 | Zimmerman et al. | 260—878 |
| 3,166,607 | 1/1965 | Cernia et al. | 260—878 |
| 3,166,608 | 1/1965 | Natta et al. | 260—878 |
| 3,177,270 | 4/1965 | Jones et al. | 260—876 |

FOREIGN PATENTS 866,131  4/1961  Great Britain.

MURRAY TILLMAN, *Primary Examiner.*

G. F. LESMES, *Assistant Examiner.*